Patented Feb. 13, 1951

2,541,184

UNITED STATES PATENT OFFICE 2,541,184

FLUORESCENT RESINS AND METHODS OF MAKING SAME

Raymond Charles Ackerman, Providence, R. I., assignor to Sun Chemical Corporation, New York, N. Y., a corporation of Delaware No Drawing. Application April 22, 1948, Serial No. 22,702

18 Claims. (Cl. 260—45.2)

This invention relates to fluorescent synthetic resinous materials and to processes for preparing the same. It is more particularly concerned with resinous materials useful in the textile industry for imparting certain improved and desirable characteristics to fabrics, and which are also characterized by the property of imparting a strong fluorescence to fabrics so treated.

One object of the present invention is to provide synthetic resinous materials which are characterized by the property of strong fluorescence.

Another object of the present invention is to provide fluorescent synthetic resinous materials adapted for impregnating textile materials to render such materials shrink resistant and crease resistant.

Another object of the present invention is to provide fluorescent synthetic resinous materials which may be utilized in many applications where fluorescence is desired but where dyes and pigments cannot be used.

Other objects of the present invention will be apparent from the following description and appended claims.

Due to the plastic qualities of cottons, rayons, linens, regenerated cellulosic materials and similar textiles, fabrics manufactured with these materials crease very readily upon handling and use. Furthermore upon washing of fabrics consisting of such materials a decided shrinkage of such fabrics often takes place to the extent, in many cases, of rendering articles fabricated with such materials undesirable or impossible of employment for the particular function or use for which such articles were designed and manufactured.

There are in common use at the present time in the textile industry several types of synthetic resinous materials which upon proper application to fabrics and subsequent curing impart to the fabrics crease- and shrink-resistant properties. These resinous materials are generally applied to the textile material in the form of a water solution or stabilized emulsion, the fabric either passing through the resin solution or riding in contact with a roller partially immersed and revolving in the resin solution. The amount of resin deposited upon the particular fabric so treated is usually controlled by passing the treated fabric through a pair, or series, of squeeze rollers, the pressure between the rollers being regulated so as to permit only that quantity of resin to be deposited upon the fabric which would afford the desired degree of shrink control and crease resistance. After the fabric has been impregnated with the resinous material, it is subjected to a curing process, consisting of a heat treatment at such temperatures and for such a period of time as to effect setting of the resin upon the fabric, the setting of the resin rendering it water insoluble and resistant in a high degree to removal by washing and cleansing operations.

The various applications which such fabrics have found in everyday usage are numerous. However, by treating textile materials so as to impart the property of fluorescence to such materials many new, novel, and pleasing effects are produced which enhance the appearance of such fabrics in many of the conventional applications in which such materials are ordinarily employed, and which also open up many new uses for such treated materials in the fields of decorative art, dresswear and the like. By the term fluorescence, as utilized in the present invention, is meant the ability of a material to emit light under excitation of light within the ultra-violet range.

Heretofore, fluorescence has been imparted to fabrics by the utilization of fluorescent organic dyes and pigments, and in some cases by the application of fluorescent inorganic pigments. One manner in which this is ordinarily accomplished is by dipping the cloth into a colorless liquid solution of a fluorescent organic compound. Another method by which this particular quality or characteristic may be imparted to textile materials is by imprinting the fabric with inks or printing pastes incorporating such fluorescent dyes or pigments, the particular dye or pigment employed being selected for the shade of color desired in the fabric under daylight or similar lighting conditions. However, several problems arise from the utilization of such fluorescent compounds which limits the effectiveness of these materials in such applications. The organic dyes and pigments are ordinarily not light fast, that is, upon prolonged exposure to daylight conditions these compounds have a tendency to fade, there also occurring a gradual loss of their power of fluorescence. Also, the color of the fluorescence imparted by these compounds varies, depending upon the particular textile material treated. Furthermore, some dyestuffs may be strongly fluorescent when applied to certain textiles and exhibit very weak fluorescence upon others. While it is possible to overcome most of these undesirable characteristics by the utilization of inorganic fluorescent pigments, these materials of themselves have no affinity for textile materials and must be applied in the form of a paste together with a binder material which mechanically holds the pigment to the fiber. Such pigment pastes usually impart an undesirable stiffness and harshness to the fabric and usually have very poor resistance to rubbing and washing.

I have found that by reacting under substantially alkaline conditions a ketone, an aldehyde and a compound selected from the group comprising the salts of guanidine and cyano derivatives of guanidine, fluorescent synthetic resinous materials are formed which, upon application to textile materials such as cotton, linen, etc. by means ordinarily employed and upon proper curing not only impart to such fabrics desirable shrink resistant and anti-crease finishes, but also impart to the fabric so treated a strong fluorescence apparent under suitable conditions of excitation.

The synthetic resinous materials of the present invention are usually clear, colorless oils, exhibiting but a slight yellowish fluorescence under ordinary daylight conditions. Due to this fact, the colors of fabrics impregnated with these resins are not appreciably affected beyond the stage of showing the same light yellowish sheen mentioned above when activated by daylight. However, under excitation by light in the ultra violet range, the resins of the present invention and fabrics treated with these resins exhibit a wide variety of brightly fluorescent colors depending upon the particular materials utilized in preparing the resins. The intensity of the fluorescence and the durability of this characteristic appears to be unaffected by aging or by long and continued exposure to daylight. By proper curing of such resin-treated fabrics, the resin is rendered water insoluble, permitting repeated washing or cleansing of the fabric without materially affecting the finish of the cloth or the fluorescence imparted by the resin.

The following illustrative examples demonstrate processes by which the products of the present invention may be prepared.

*Example I*

75 parts by weight of acetone and 246 parts by weight of a 37% aqueous formaldehyde solution are charged to a suitable reaction vessel equipped with means for heating the said vessel. The molecular proportion of formaldehyde to acetone satisfactorily utilized in the instant procedure is 2:1. Heating is begun and when the temperature of the materials in the reaction vessel has reached approximately 50° C., a total of 60 parts by weight of guanidine carbonate are slowly added to the reaction mixture in portions sufficient to maintain a pH of at least 8.0 for the duration of the reaction. After the guanidine carbonate has been incorporated into the admixture approximately 30 parts by weight of phosphoric acid, or an amount sufficient to reduce the pH of the reacting materials to approximately 7.0, is added to the reaction product. Heating is continued at a boil for approximately 30 minutes at which time the reaction product exhibits a strong blue green fluorescence under ultra violet light. Heating is discontinued at this point and the reaction product is allowed to cool. In order to obtain the resin in a concentrated form, sufficient methanol is added to the reaction product to extract the water of reaction, leaving the resin behind as a heavy oil which is miscible with water in all proportions.

*Example II*

By following the procedure outlined in Example I and using the following proportions of materials, a fluorescent resinous product similar to that prepared in Example I is obtained.

| | Parts by weight |
|---|---|
| Guanidine carbonate | 19.7 |
| Formaldehyde (37% aqueous solution) | 49.0 |
| Acetone | 7.9 |
| Phosphoric acid | 23.4 |

The molecular ratio of formaldehyde to acetone of 4.4:1 is satisfactorily employed here.

By determining beforehand the amount of guanidine carbonate needed to satisfactorily react with definite molecular proportions of the resin forming materials to produce the desired results of the present invention, it is possible to incorporate the calculated amount of guanidine carbonate into the reaction mixture before the start of the reaction with the assurance that the finished product will exhibit the characteristics of the resinous materials obtained in Examples I and II. This is demonstrated in the following example.

*Example III*

116 parts by weight of acetone, 370 parts by weight of 37% aqueous formaldehyde solution and 90 parts by weight of guanidine carbonate are charged to a suitable reaction vessel and heated to approximately 50° C. at which point a violent reaction occurs. The reaction is continued for approximately 30 minutes, the temperature being satisfactorily maintained between approximately 50°–60° C. Sufficient phosphoric acid is added to neutralize the reaction mixture, approximately 25 parts by weight of 75% aqueous phosphoric acid being used for this purpose. The reaction mixture is then boiled at reflux for approximately one hour at which time a strong blue green fluorescence is apparent. The resin is obtained in concentrated form as a water miscible oil by extracting the water of reaction by the method as set forth in Example I. The molecular proportion of formaldehyde to acetone utilized in this example is 4.5:2.

In carrying out the present invention, I have found that in order to produce the desirable results of the present invention, it is essential that the reaction involving the resin forming materials be carried out in a substantially alkaline medium, the reaction mixture being maintained at a pH of not less than about 8.0, so that the resulting water-soluble resinous reaction product has a pH, before neutralization thereof, of at least 8.0. When the reaction outlined in Examples I and II are carried out under conditions in which the pH of the reaction is less than about 8.0 and at no time during the reaction period exceeds such a degree of alkalinity, resinous materials are formed which show no fluorescence comparable to that exhibited by the products of the present invention. Furthermore when neutral and acid salts of guanidine, and such a derivative of guanidine as dicyandiamide, are substituted for guanidine carbonate in the processes of the present invention, it is necessary in order to produce the desirable products of the present invention to incorporate into the reaction mixture a material which itself is sufficiently alkaline when added in such amounts as are hereinafter set forth as to raise the pH of the reaction to a point not less than approximately 8.0 and to maintain such a pH until the reaction has attained completion. Some such materials which may be utilized to provide the required alkalinity are sodium carbonate sodium hydroxide, potassium hydroxide and similar alkaline compounds. This is demonstrated in the following illustrative example.

Example IV 116 parts by weight of acetone, 420 parts by weight of 37% aqueous formaldehyde solution and 84 parts by weight of dicyandiamide are reacted under heating conditions till the reaction is complete. The time required for the reaction is approximately 30 minutes. The reaction product at this point exhibits no sign of fluorescence. 10 parts by weight of sodium carbonate in 25 parts by weight of water are added to the reaction product, whereupon a violent reaction takes place and a strong fluorescence is observed in the resin thus formed. The resin is then subjected to continued heating to effect the desired degree of polymerization and is then acid neutralized before the water insoluble stage of polymerization has been attained. The resin thus prepared is completely miscible with water and possesses a bright blue-green fluorescence.

The water solubility of the resinous products of the present invention is critically affected by the degree of polymerization of the said resins which is effected by continued heating of the neutralized reaction product. Upon prolonged heating of the reaction products of the present invention, the water solubility of the resinous materials formed in the reactions as set forth in the illustrative examples is gradually diminished till complete water insolubility has been attained, the resins becoming alcohol soluble during the process. Whereas the water soluble resins are generally materials having the consistency of oils, increased polymerization renders them more highly viscous until finally a hard solid stage is reached. Such resinous materials may be utilized in the production of fluorescent molded plastics.

The intensity of the fluorescence of the products of the present invention is largely dependent upon the degree of polymerization of the resins. Since the reaction products exhibit such fluorescent properties before the addition thereto of the neutralizing acid material and since the intensity of such fluorescence may be increased by heating the reaction products without prior neutralization, it is evident that the acid material itself does not contribute to the fluorescence of the products of the present invention. However, any attempt to effect polymerization under substantially alkaline conditions usually results in the formation of a water insoluble gel which is entirely unsatisfactory for such commercial applications as are herein set forth. I have found that by neutralizing the reaction product after the original resin forming reaction has been completed, the reaction mass may be heated as long as is desired without resulting in a gel formation. Moreover, the acid material seems to have a catalytic effect upon the polymerization rate, reducing considerably the time required to effect the desired degree of polymerization, fluorescence, and consistency of the products of the present invention. Since the particular acid material utilized does not of itself affect the reaction involved in the processes of the present invention, any acid material may be employed in carrying out the invention. This is demonstrated in the following examples.

Example V 90 parts by weight of guanidine carbonate, 116 parts by weight of acetone and 420 parts by weight of 37% aqueous solution of formaldehyde are reacted with heating for approximately 30 minutes, neutralized with about 30 parts by weight of 75% aqueous phosphoric acid and heated for approximately 3 hours. The resin thus formed is characterized by a strong blue-green fluorescence.

Example VI

By substituting about 20 parts by weight of 36% hydrochloric acid for the phosphoric acid in Example V and by otherwise keeping the proportions of materials utilized and the reaction conditions the same, a strongly fluorescent resinous material similar to that secured in Example V is obtained.

Example VII

By substituting about 25 parts by weight of 50% sulfuric acid for the phosphoric acid in Example V and by otherwise keeping the proportions of materials utilized and the reaction conditions the same, a strongly fluorescent resinous material similar to that secured in Examples V and VI is obtained.

Any one or more of the reacting materials utilized in the above illustrative examples may be replaced by an equi-molecular weight of a compound selected from the group comprising the said compounds to form the desirable products of the present invention. For example, in place of acetone there may be substituted methyl ethyl ketone, methyl isobutyl ketone, diethyl ketone, acetyl acetone and, generally, other ketones. In place of formaldehyde there may be substituted acetaldehyde, propionaldehyde, benzaldehyde, glyoxal and acrolein. Generally such salts of guanidine as the phosphate, the nitrate, the hydrochloride and others may be utilized in carrying out my invention.

By reacting dicyandiamide with methyl ethyl ketone and formaldehyde, a resin which exhibits an extremely bright blue-green fluorescence may be prepared.

Example VIII

Thus, 84 parts by weight of dicyandiamide are reacted with 144 parts by weight of methyl ethyl ketone and 420 parts by weight of a 37% aqueous formaldehyde solution for approximately 30 minutes. 10 parts by weight of sodium carbonate dissolved in 25 parts by weight of water are added to the reaction mixture and heating is continued for approximately 1-1½ hours. By neutralizing the reaction product at this point, the resinous material mentioned above is obtained. The molecular proportion of formaldehyde to ketone utilized in preparing the resinous material of the present example is 5:2.

Resins may also be prepared exhibiting other fluorescent colors by changing the particular materials utilized in carrying out the present invention.

Example IX

For example, 90 parts by weight of guanidine carbonate are reacted with 144 parts by weight of methyl ethyl ketone and 420 parts by weight of 37% aqueous formaldehyde solution for approximately 30 minutes. By neutralizing the reaction product with about 37 parts by weight of 36% hydrochloric acid and by continued heating, a resinous material is obtained which exhibits a strong orange fluorescence under ultraviolet light. A ratio of formaldehyde to ketone in the molecular proportion of 5:2 is satisfactorily employed in preparing the resinous material obtained above.

It is not essential nor critical that a particular ratio of aldehyde to ketone be employed to prepare the novel and desirable products of the present invention. Such resinous materials as are obtained by the reactions outlined in the above illustrative examples may be prepared by varying the molecular proportion of the aldehyde to the ketone preferably within the ratio of 1:1 to 6:1. In the illustrative examples demonstrating the present invention, the combined aldehyde and ketone reactants are employed in a ratio of between approximately 6.7 and 14 mols of the said reactants to one mol of dicyandiamide or guanidine carbonate. While fluorescence may still be observed in the products prepared according to the present invention but utilizing molecular proportions of aldehyde to ketone beyond the preferred limits set forth above, the products thus obtained have generally been found to be undesirable for utilization in such commercial applications in which the products of the present invention have been found to be especially useful.

Those resinous products of the present invention which have not been carried beyond the water soluble stage during the polymerization reaction, have been found to be particularly useful in the field of textile finishing to provide crisp, anti-crease and shrink resistant finishes while also imparting a strong fluorescence to the treated fabric. Such finishes may be obtained by subjecting the fabric to be treated, to such an operation for impregnating fabrics with resins as is hereinbefore described, utilizing preferably a 10-20 per cent aqueous solution of a resinous material of the present invention, depending upon the particular qualities desired in the finished fabric. To impart merely fluorescent properties to textile materials where shrink resistant and anti-crease finishes are not requisite, aqueous solutions of as low as 1 per cent resin concentration are completely satisfactory. By subjecting the resin treated fabric to a subsequent curing operation, a durable, long lasting finish is obtained which is highly resistant to removal by washing and similar cleansing operations.

A further feature of the products of the present invention is that, whereas those resins which are commonly utilized in the textile industry to provide anti-crease and shrink resistant finishes ordinarily require the addition to the resin solution of a suitable catalyst to aid the setting of the resins upon the fabric during the curing operation, no such catalyst is required by the resins of the present invention in order to effect the desired results. A catalytic material which promotes polymerization of the resin to the water insoluble stage upon subsequent heat treatment, is incorporated into the resin during the resin forming reaction and is retained in the resin itself.

The resinous materials of the present invention are generally compatible with such other resinous materials as the urea-formaldehyde and thiourea-formaldehyde resins, other ketone formaldehyde resins, and methylolurea condensates. The water soluble resins of the present invention may therefor be used in combination with the water soluble resins of the types mentioned above to provide fluorescent textile finishes characteristic of the particular resinous materials utilized.

There are many commercial applications possible with textile materials treated with the fluorescent resins of the present invention. Since such materials exhibit a slight yellowish fluorescence in daylight without materially altering the colors of dyed fabrics, they may be employed for ordinary dresswear, providing a pleasing and colorful appearance. Draperies, carpets, woven murals, and other like decorative materials when treated with the resins of the present invention, provide pleasant fluorescent effects under the excitation of ultra-violet rays such as the well known "black" light especially where subdued lighting is desired.

My resins may also be employed in industrial applications where the use of pigments would be objectionable, such as marking fabrics for identification purposes and for marking seam-lines on knitted goods. In the latter application, the knitting needles, operating at that point which subsequently is to be a seam line, may dip into a solution of the resin during the knitting operation and thus deposit a slight amount of the resin upon the yarn during the stitch formation, producing a nearly invisible line upon the knitted material which becomes visible under the ultra-violet light. The resin may subsequently be removed by washing. Pigments utilized in such an application would have a tendency to clog the needles, resulting in many torn stitches and requiring frequent stoppages of the knitting operation to permit cleaning of the knitting needles.

By mixing the resinous materials of the present invention with suitable molding powders and fillers and subjecting such mixtures to a molding operation, plastic products are formed which exhibit the same fluorescent properties as the particular resins thus utilized. The plastic materials thus formed may be clear and transparent or opaque depending upon the materials used in combination with my resins.

While the products described herein and methods of making the same constitute preferred embodiments of the present invention, changes may be made therein without departing from the scope of the present invention as defined in the specification and in the appended claims.

What is claimed is:

1. A method of preparing a thermosetting fluorescent resinous material which comprises heat reacting, at a pH of at least 8.0, a lower aliphatic aldehyde and a lower dialkyl ketone in the ratio of 1 to 6 mols of the aldehyde to one mol of the ketone, and co-reacting therewith a material selected from the group consisting of dicyandiamide and the salts of guanidine in the molar ratio of said material to the combined aldehyde and ketone reactants of between approximately 1 to 6.7 and 1 to 14 to form a water soluble reaction product.

2. A method of preparing a thermosetting fluorescent resinous material which comprises heat reacting a lower aliphatic aldehyde and a lower dialkyl ketone in the ratio of between 1 to 6 mols of the aldehyde to one mol of the ketone, together with a sufficient amount of guanidine carbonate to yield a water soluble reaction product having a pH of at least 8.0.

3. A method of preparing a thermosetting fluorescent resinous material which comprises heat reacting formaldehyde and acetone in the ratio of between 1 to 6 mols of formaldehyde to one mol of acetone, together with a sufficient amount of guanidine carbonate to yield a water soluble reaction product having a pH of at least 8.0.

4. A method of preparing a thermosetting fluorescent resinous material which comprises heat reacting formaldehyde and methyl ethyl ketone in the ratio of between 1 to 6 mols of formaldehyde to one mol of the ketone, together with a sufficient amount of guanidine carbonate to yield a water soluble reaction product having a pH of at least 8.0.

5. A method of preparing a thermosetting fluorescent resinous material which comprises heat reacting a lower aliphatic aldehyde and a lower dialkyl ketone in the ratio of between 1 to 6 mols of the aldehyde to 1 mol of the ketone, co-reacting therewith dicyandiamide in the molar ratio of dicyandiamide to the combined aldehyde and ketone reactants of between 1 to 6.7 and 1 to 14 together with a sufficient amount of an alkaline material to yield a water soluble reaction product having a pH of at least 8.0.

6. A method of preparing a thermosetting fluorescent resinous material which comprises heat reacting formaldehyde and acetone in the ratio of between 1 to 6 mols of the aldehyde to 1 mol of the ketone, co-reacting therewith dicyandiamide in the molar ratio of dicyandiamide to the combined aldehyde and ketone reactants of between 1 to 6.7 and 1 to 14, together with a sufficient amount of an alkaline material to yield a water soluble reaction product having a pH of at least 8.0.

7. A method of preparing a thermosetting fluorescent resinous material which comprises heat reacting formaldehyde and methyl ethyl ketone in the ratio of between 1 to 6 mols of the aldehyde to 1 mol of the ketone, co-reacting therewith dicyandiamide in the molar ratio of dicyandiamide to the combined aldehyde and ketone reactants of between 1 to 6.7 and 1 to 14, together with a sufficient amount of an alkaline material to yield a water soluble reaction product having a pH of at least 8.0.

8. A thermosetting fluorescent resinous material comprising the water soluble reaction product resulting from the heat reaction, at a pH of at least 8.0, of a lower aliphatic aldehyde and a lower dialkyl ketone in the ratio of between 1 to 6 mols of the aldehyde to 1 mol of the ketone, and the co-reaction therewith of a material selected from the group consisting of dicyandiamide and the salts of guanidine in the molar ratio of the said material to the combined aldehyde and ketone reactants of between approximately 1 to 6.7 and 1 to 14.

9. A thermosetting fluorescent resinous material comprising the water soluble reaction product resulting from the heat reaction, at a pH of at least 8.0, of a lower aliphatic aldehyde and a lower dialkyl ketone in the ratio of between 1 to 6 mols of the aldehyde to 1 mol of the ketone, and the co-reaction therewith of guanidine carbonate in the molar ratio of guanidine carbonate to the combined aldehyde and ketone reactants of between approximately 1 to 6.7 and 1 to 14.

10. A thermosetting fluorescent resinous material comprising the water soluble reaction products resulting from the heat reaction, at a pH of at least 8.0, of formaldehyde and acetone in the ratio of between 1 to 6 mols of the aldehyde to 1 mol of the ketone, and the co-reaction therewith of guanidine carbonate in the molar ratio of guanidine carbonate to the combined aldehyde and ketone reactants of between approximately 1 to 6.7 and 1 to 14.

11. A thermosetting fluorescent resinous material comprising the water soluble reaction product resulting from the heat reaction, at a pH of at least 8.0, of formaldehyde and methyl ethyl ketone in the ratio of between 1 to 6 mols of the aldehyde to one mol of the ketone, and the co-reaction therewith of guanidine carbonate in the molar ratio of guanidine carbonate to the combined aldehyde and ketone reactants of between approximately 1 to 6.7 and 1 to 14.

12. A thermosetting fluorescent resinous material comprising the water soluble reaction product resulting from the heat reaction, at a pH of at least 8.0, of a lower aliphatic aldehyde and a lower dialkyl ketone in the ratio of between 1 to 6 mols of the aldehyde to one mol of the ketone, and the co-reaction therewith of dicyandiamide in the molar ratio of dicyandiamide to the combined aldehyde and ketone reactants of between approximately 1 to 6.7 and 1 to 14.

13. A thermosetting fluorescent resinous material comprising the water soluble reaction product resulting from the heat reaction, at a pH of at least 8.0, of formaldehyde and acetone in the ratio of between 1 to 6 mols of the aldehyde to 1 mol of the ketone, and the co-reaction therewith of dicyandiamide in the molar ratio of dicyandiamide to the combined aldehyde and ketone reactants of between approximately 1 to 6.7 and 1 to 14.

14. A thermosetting fluorescent resinous material comprising the water soluble reaction product resulting from a heat reaction, at a pH of at least 8.0, of formaldehyde and methyl ethyl ketone in the ratio of between 1 to 6 mols of the aldehyde to one mol of the ketone, and the co-reaction therewith of dicyandiamide in the molar ratio of dicyandiamide to the combined aldehyde and ketone reactants of between approximately 1 to 6.7 and 1 to 14.

15. A method of finishing textile materials which comprises the process of subjecting a fabric to treatment with an aqueous solution of a fluorescent resinous material comprising the neutralized water soluble reaction product resulting from the heat reaction, at a pH of at least 8.0, of a lower aliphatic aldehyde and a lower dialkyl ketone in the ratio of between 1 to 6 mols of the aldehyde to 1 mol of the ketone, and the co-reaction therewith of a material selected from the group consisting of dicyandiamide and the salts of guanidine in the molar ratio of the said material to the combined aldehyde and ketone reactants of between approximately 1 to 6.7 and 1 to 14.

16. A treated textile material comprising the product obtained by subjecting a fabric to treatment with an aqueous solution of a fluorescent resinous material comprising the neutralized water soluble reaction product resulting from the heat reaction, at a pH of at least 8.0 of a lower aliphatic aldehyde and a lower dialkyl ketone in the ratio of between 1 to 6 mols of the aldehyde to one mol of the ketone, and the co-reaction therewith of a material selected from the group consisting of dicyandiamide and the salts of guanidine in the molar ratio of the said material to the combined aldehyde and ketone reactants of between approximately 1 to 6.7 and 1 to 14.

17. A method of preparing a thermosetting fluorescent resinous material which comprises heat reacting, at a pH of at least 8.0, formaldehyde and acetone in the ratio of 1 to 6 mols of the aldehyde to one mol of the ketone, and co-reacting therewith guanidine carbonate in the molar ratio of guanidine carbonate to the combined aldehyde and ketone reactants of between approximately 1 to 6.7 and 1 to 14 to form a water soluble reaction product.

18. A method of preparing a thermosetting fluorescent resinous material which comprises heat reacting, at a pH of at least 8.0, formaldehyde and methyl ethyl ketone in the ratio of 1 to 6 mols of the aldehyde to 1 mol of the ketone, and co-reacting therewith, guanidine carbonate in the molar ratio of guanidine carbonate to the combined aldehyde and ketone reactants of between approximately 1 to 6.7 and 1 to 14 to form a water soluble reaction product.

RAYMOND CHARLES ACKERMAN.

REFERENCES CITED

The following references are of record in the file of this patent:

UNITED STATES PATENTS

| Number | Name | Date |
|---|---|---|
| 2,257,239 | Krzikalla et al. | Sept. 30, 1941 |
| 2,323,898 | D'Alelio | July 13, 1943 |
| 2,325,376 | D'Alelio | July 27, 1943 |
| 2,364,900 | Hessel et al. | Dec. 12, 1944 |